United States Patent [19]

Olsson et al.

[11] Patent Number: 4,548,187
[45] Date of Patent: Oct. 22, 1985

[54] INTERNAL COMBUSTION ENGINE FOR ALTERNATIVE FUELS

[75] Inventors: John Olsson; Bertil Olsson; Gunnar Olsson, all of Partille, Sweden

[73] Assignee: J-Jet Konstruktions, Partille, Sweden

[21] Appl. No.: 513,118

[22] PCT Filed: Oct. 15, 1982

[86] PCT No.: PCT/SE82/00333
§ 371 Date: Jun. 15, 1983
§ 102(e) Date: Jun. 15, 1983

[87] PCT Pub. No.: WO83/01486
PCT Pub. Date: Apr. 28, 1983

[30] Foreign Application Priority Data
Oct. 16, 1981 [SE] Sweden ................................ 8106113

[51] Int. Cl.⁴ .......................................... F02M 31/00
[52] U.S. Cl. .................................. 123/557; 123/25 C; 123/25 E
[58] Field of Search ............... 123/557, 25 B, 25 C, 123/25 D, 25 E, 25 F, 308, 478

[56] References Cited

U.S. PATENT DOCUMENTS

| | | | |
|---|---|---|---|
| 1,361,503 | 12/1920 | Smith | 123/557 |
| 1,555,991 | 10/1925 | Kunar | 123/25 C |
| 1,632,926 | 6/1927 | Scott | 123/557 |
| 2,150,905 | 3/1939 | Belgau | 123/557 |
| 2,482,864 | 9/1949 | Nemnich | 123/557 |
| 3,696,795 | 10/1972 | Smith et al. | 123/25 C |
| 3,762,378 | 10/1973 | Bitonti | 123/557 |
| 3,933,135 | 1/1976 | Zillman | 123/557 |
| 4,030,453 | 6/1977 | Sugimoto | 123/557 |
| 4,040,400 | 8/1977 | Kiener | 123/557 |
| 4,231,333 | 11/1980 | Thatcher | 123/478 |

FOREIGN PATENT DOCUMENTS

| | | |
|---|---|---|
| 1751237 | 4/1968 | Fed. Rep. of Germany . |
| 2117316 | 3/1972 | Fed. Rep. of Germany . |
| 2228527 | 1/1973 | Fed. Rep. of Germany . |
| 2557137 | 6/1976 | Fed. Rep. of Germany . |
| 2604734 | 8/1976 | Fed. Rep. of Germany . |
| 2604402 | 8/1977 | Fed. Rep. of Germany . |
| 2604903 | 8/1977 | Fed. Rep. of Germany . |
| 2831694 | 1/1980 | Fed. Rep. of Germany . |
| 1325833 | 8/1973 | United Kingdom . |
| 2015646 | 9/1979 | United Kingdom . |
| 1570940 | 7/1980 | United Kingdom . |

Primary Examiner—Ronald H. Lazarus
Attorney, Agent, or Firm—Holman & Stern

[57] ABSTRACT

A method of running an internal combustion engine with alternative fuels such as high or low octane gasoline, paraffin, diesel oil, ethanol, methanol or similar fuels and/or mixtures thereof and combustible gases such as LP-gas and the like at unchanged compression ratio, and which each motor cylinder can be supplied with a further medium besides the fuel for running of the engine and the fuel is heated by the heat from the exhaust system (22, 23). The invention also refers to an internal combustion engine for alternative fuels. This object has been achieved by proportioning and distributing the fuel to each motor cylinder in relation to the air sucked up and that the fuel before entering the motor cylinder is heated to a temperature between its flame temperature and above its evaporation temperature and that the evaporated fuel is fed to the respective motor cylinder preferably at a flat tangential interjection angle and when using low octane fuel as an extra medium water or a mixture of water and an antifreezing agent is injected in controlled amounts at a steeper injection angle inside the path of the fuel.

11 Claims, 12 Drawing Figures

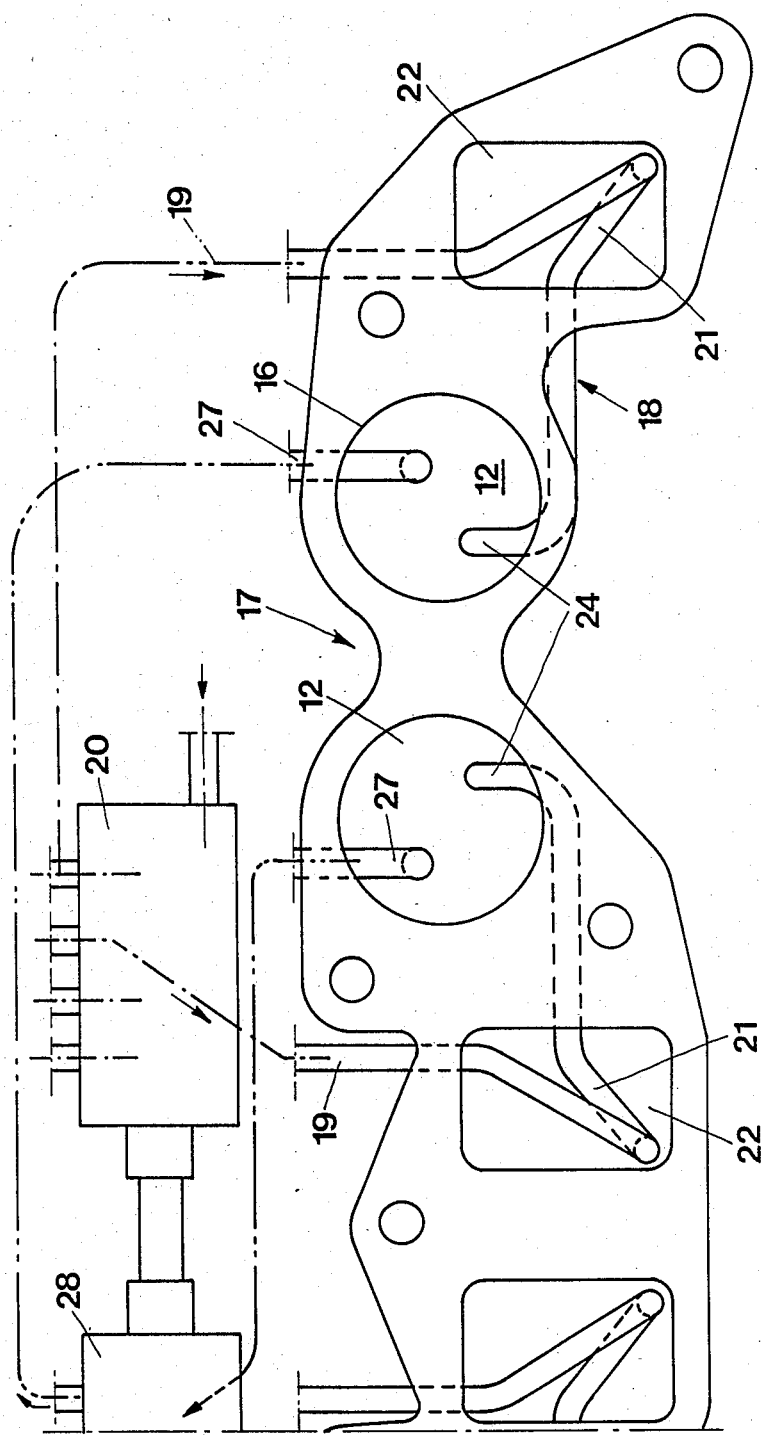

INTERNAL COMBUSTION ENGINE FOR ALTERNATIVE FUELS

BACKGROUND OF THE INVENTION

1. Field of the Invention

This invention relates to a method of running an internal combustion engine with alternative fuels, as high or low octane gasoline, paraffin, diesel oil, ethanol, methanol or similar fuels and/or mixtures thereof and combustible gases as LP-gas and the like with an unchanged compression ratio, wherein each of the cylinders can be fed with an extra medium besides the fuel needed for running the engine, said fuel being heated by the heat from the exhaust system. The invention also relates to a combustion engine capable of running with alternative fuels.

2. Description of the Prior Art

Today there is no possibility to use more or less all existing fuels in the same engine without changing the compression ratio.

In order to be able to use thicker oils in diesel engines it has previously been suggested to heat the fuel by the heat from the exhaust gases to achieve lower viscosity, whereby compression heat is consumed for vaporizing and combusting the oil. In this way a lower compression and/or higher power output and usage of thicker oil have been made possible.

It has also been suggested to heat the fuel before it enters the intake manifold, in order to reduce unpleasant discharge of exhaust gases at low engine speed.

With direct injection internal combustion engines it is further known to use preheated air for the intake-manifold at idling and low-load-condition. Attempts are made to achieve cleaner exhaust gases and lower fuel consumption at idling and low-load-condition in this way.

In previously known mechanically controlled gasoline injection systems the injection is performed continuously and needs no driving from the engine. The amount of fuel injected is regulated by the amount of air that is sucked into each cylinder.

All these known proposed improvements solve some minor problems, but none of them solve the problem of running an internal combustion engine, for example an Otto-engine, with a great number of alternative fuels.

BRIEF SUMMARY OF THE INVENTION

The object of this invention is to provide a method of running an internal combustion engine with alternative fuels. With a regulating lever at the dashboard you can switch from one fuel to another, even if the engine has a high compression ratio and is a two-or four-stroke engine with conventional ignition system. The running of the engine will be non-detonating, provide improved fuel-economy, cleaner exhaust gases and will not shorten the life of the engine.

These objects have been achieved by proportioning and distributing the fuel to each motor cylinder in relation to the air sucked up, and by heating the fuel to a temperature between its flame temperature and above its evaporation temperature before entering the cylinder. The evaporated fuel is fed into the respective cylinder at a flat tangentional injection angle, and in the use of low octane fuel as an extra medium water, or a mixture of water and an antifreezing agent, is injected in a controlled amount at a steeper injection angle inside the path of the fuel.

BRIEF DESCRIPTION OF THE DRAWINGS

The invention will now be described in greater detail with reference to the accompanying drawings wherein:

FIG. 4 is a front elevational view of the heat exchange assembly in the shape of a middle flange in a front view.

DETAILED DESCRIPTION

Figure 1:
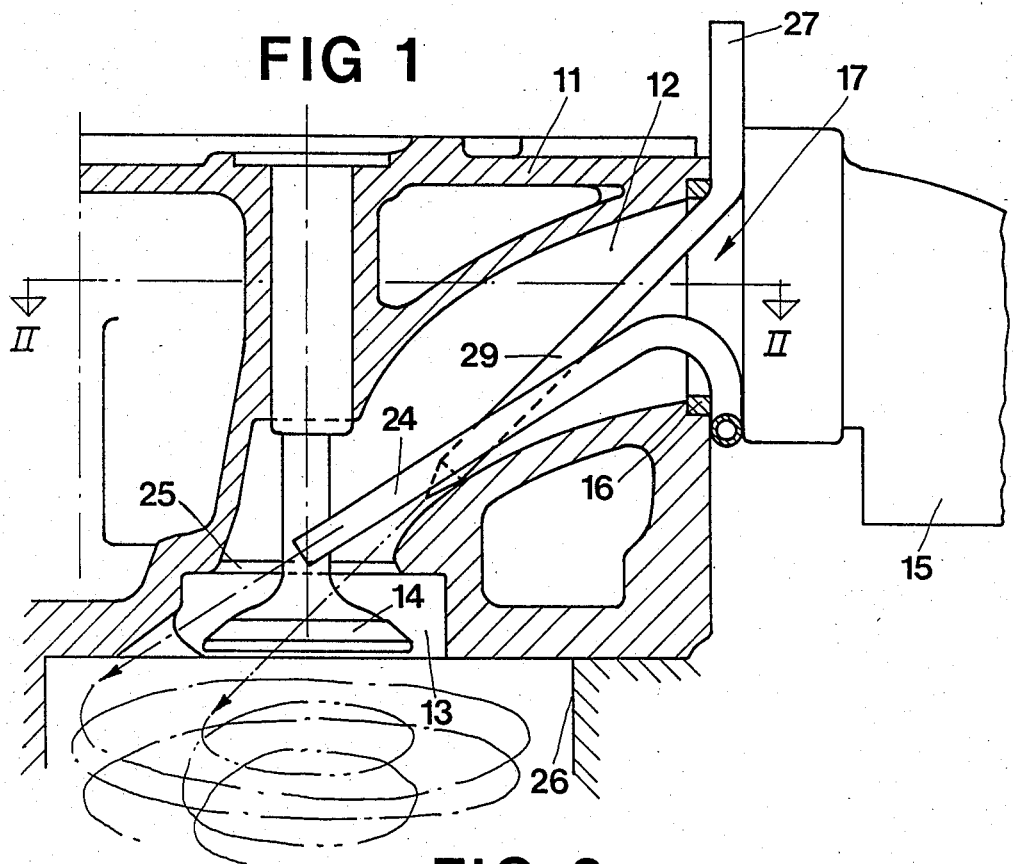
FIG. 1 is a cross-sectional view through a part of a cylinder head opposite the inlet valve in accordance with the invention.
Figure 2:
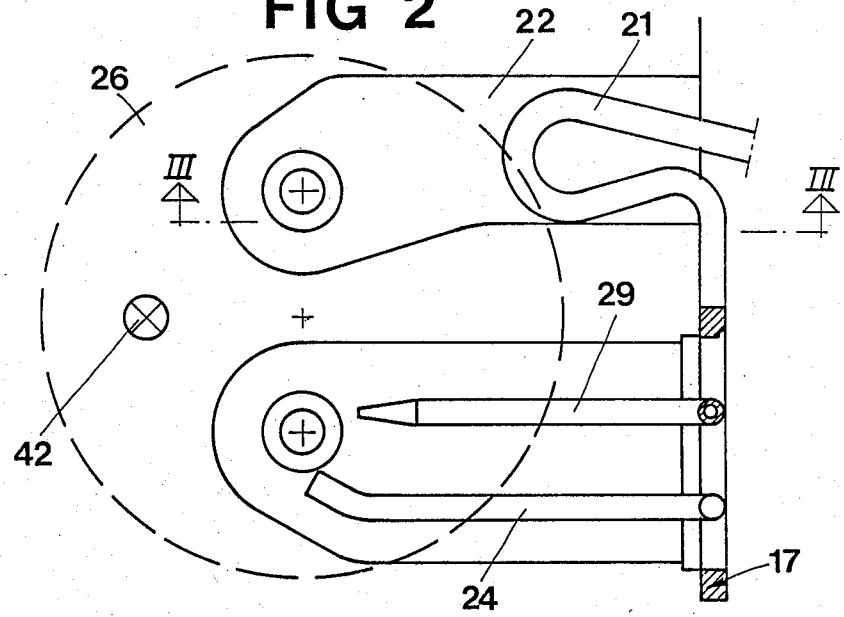
FIG. 2 is a cross section taken on line II—II in FIG. 1.
Figure 3:
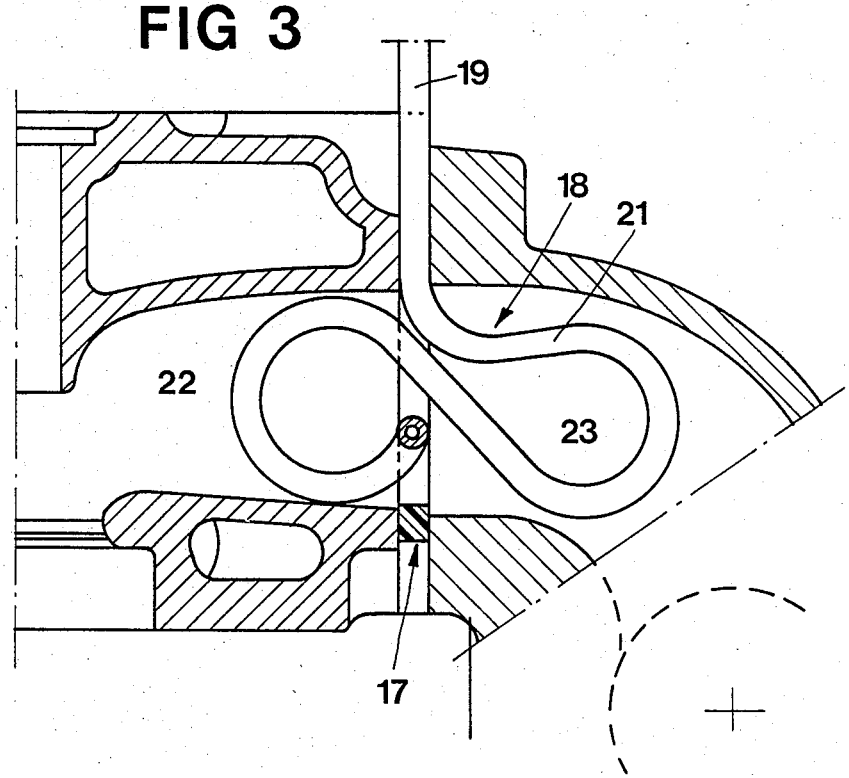
FIG. 3 is a cross section taken along the line III—III in FIG. 2.
Figure 6:
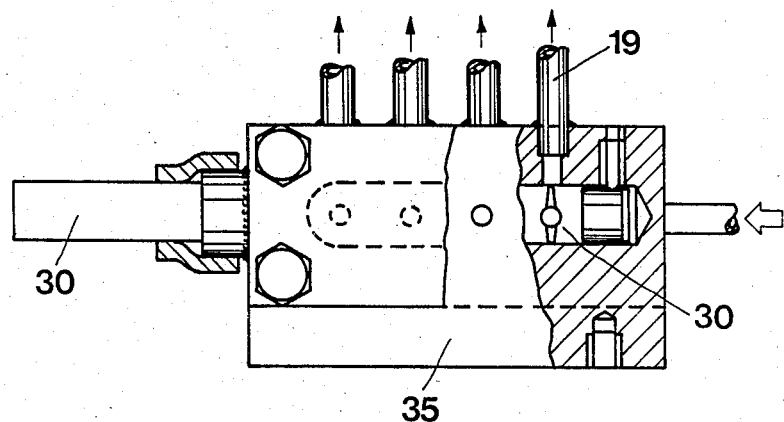
FIG. 6 is an elevational, partly cross-sectional view of the feeding device according to the invention.
Figure 5:
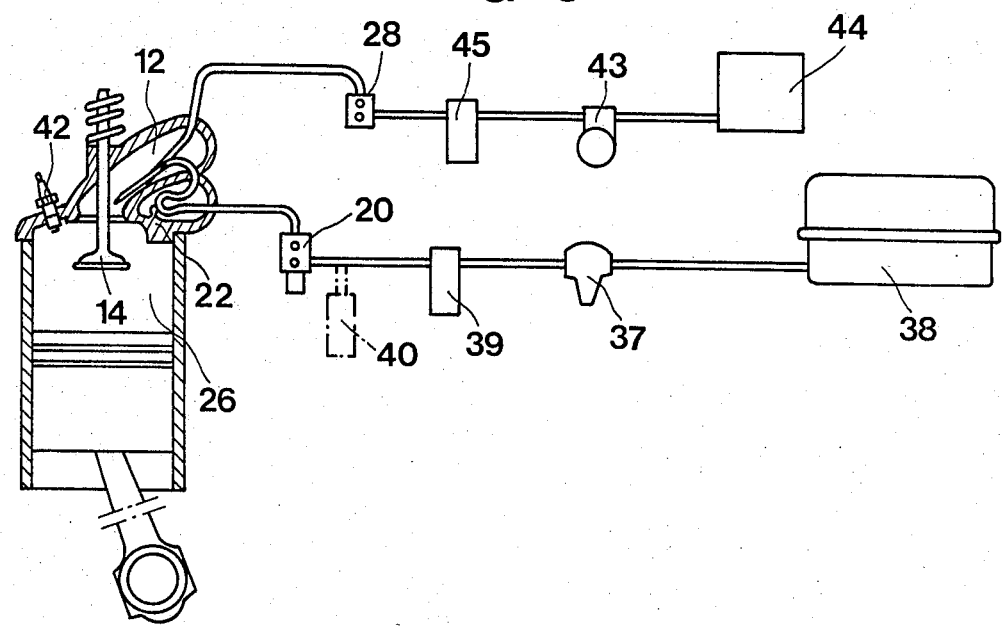
FIG. 5 is a schematic drawing of the engine and its fuel system.
Figure 7:
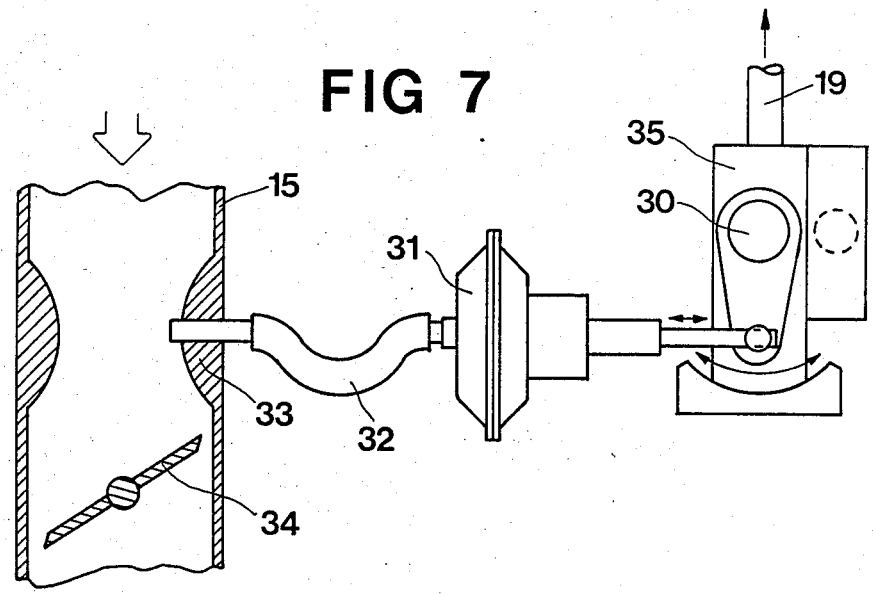
FIG. 7 is an end view of the feeding device togehter with the regulating unit.

In the drawings the numeral 11 refers to a cylinder head of an internal combustion engine, 12 is the inlet to the combustion chamber 13, 14 is an inlet valve and 15 is the inlet manifold.

Between the manifold 15 and the inlet port 16 is a spacer 17 which in its outer shape looks like the normal gasket. In the spacer 17, see FIG. 4, are arranged fuel lines 18 one to each cylinder. The fuel pipe comprise a fitting 19 connected to a fuel feeding device 20, a heat exchanger loop 21, which is partly positioned in the outlet channel in the exhaust gas channel of the respective cylinder 22 and partly in the exhaust manifold 23. The fuel pipe further comprises an injection part 24, which is directed towards the gap of the inlet valve 14 in such a manner that a flat tangential angle is achieved with respect to the cylinder wall 26.

The spacer 17 is also provided with a feeding line 27 which is fitted to a second feeding device 28 coupled in series with the feeding device 20 and feeding the engine with another medium, by way of example, cold water. The feeding line 27 is in the inlet channel equipped with a nozzle 29, which is directed at a steeper angle than the injection part 24, towards the gap of the inlet valve. The venturi tube of the nozzle 29 has a relatively small opening, causing a thin jet of water.

The fuel feeding device 20 and the water feeding device 28, which are of the same principal construction distribute the fuel and the water respectively in relation to the amount of air sucked into the motor cylinders. A distributing valve 30 which is pivoted about its longitudinal axis distributes the fuel and the water (if needed) dependent on the pivoting movement of the valve to the respective cylinder through the fitting 19 of the fuel pipe 18 and the feeding line 27 respectively. Both distributing valves 30 of the feeding devices 20 and 28, are joined together and are both regulated by a vacuum diaphragm 31 which through the line 32 communicates with a venturi 33 in the air intake 15, which as seen in the direction of the air flow is positioned in front of the throttle 34.

The distributor casing 35 of the feeding devices 20, 28 is pivotally mounted about the distributor valve 30 for adjusting the fuel amount.

Figure 8:
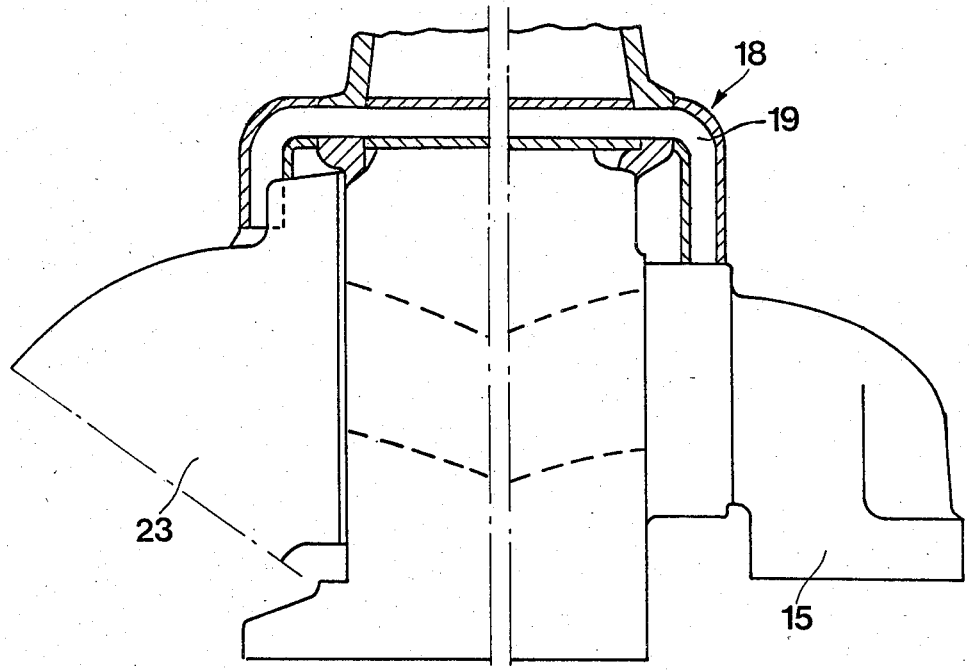
FIG. 8 is a partly cross-sectional view of a heat-exchange-assembly in a V-engine.

FIG. 8 shows how the evaporated fuel is conveyed from the exhaust side over the cylinder head to the inlet side. The tube connection between the exhaust and the intake side can possibly be made by a tube of a resistance material (i.e. Kanthal) and thus be heated electrically or insulated by a ceramic material.

Figure 12:
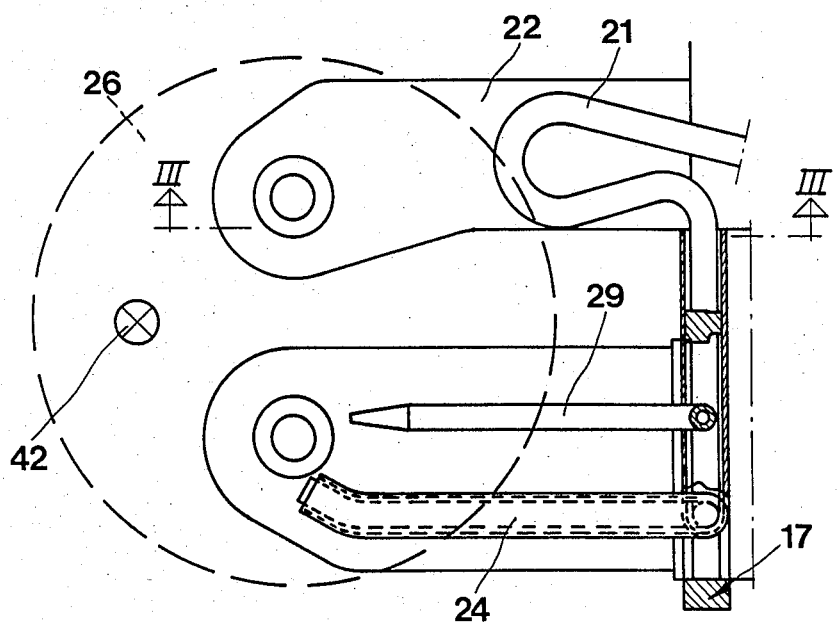
FIG. 12 is a cross-sectional view corresponding to FIG. 2 but of a modified embodiment.

In FIG. 12 is shown an embodiment where the injection part 24 of the fuel pipe 18 has double walls and where exhaust gases are allowed to stream in the space between said double walls to the combustion chamber 13 and thus heat the fuel.

Figure 9:
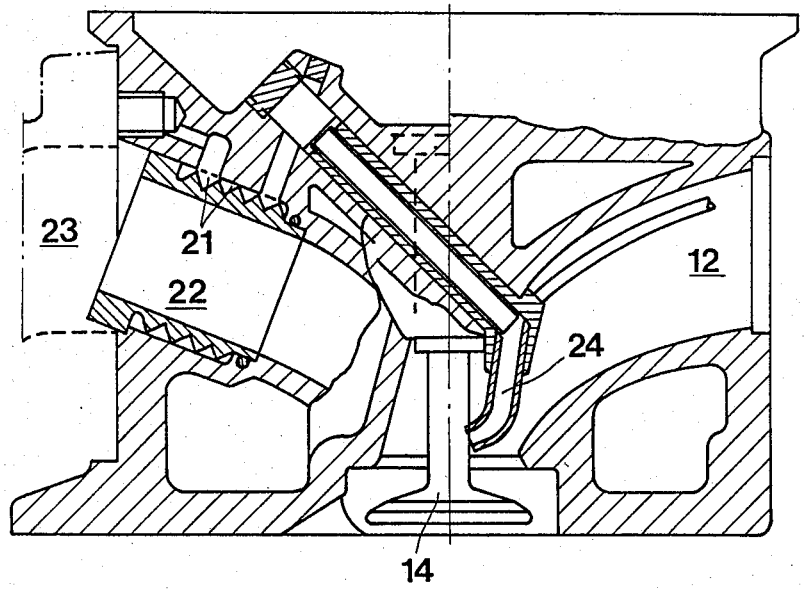
FIG. 9 is a cross-sectional view of through a part of a cylinder head where the invention is applied in new production of an internal combustion engine.

In the new production the heat exchanger and the fuel pipe to the cylinder are built-in permanently in the cylinder head as shown in FIG. 9, while the feeding line 27 is placed as previously described.

Figure 10:
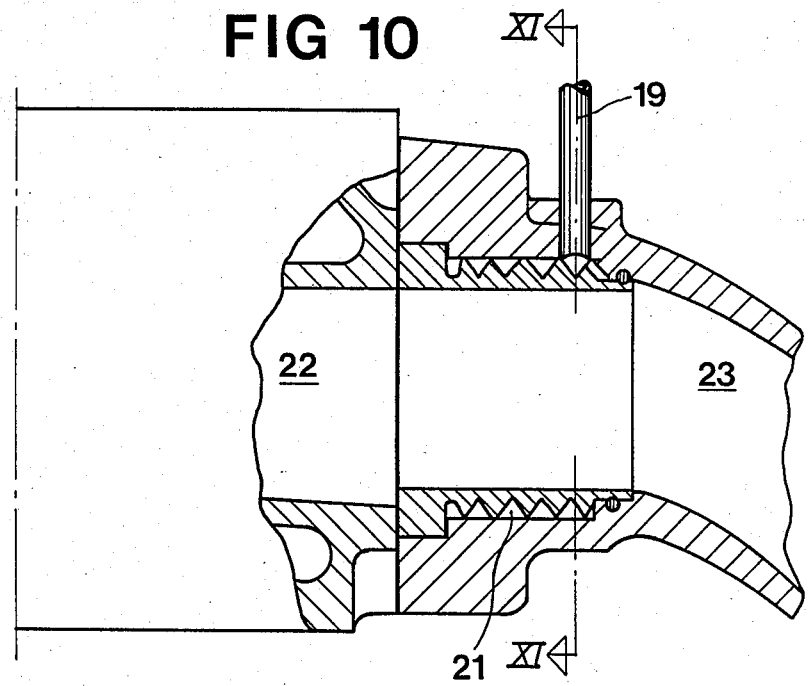
FIG. 10 is a cross-sectional view through the outlet-manifold with an alternative heat exchanger.
Figure 11:
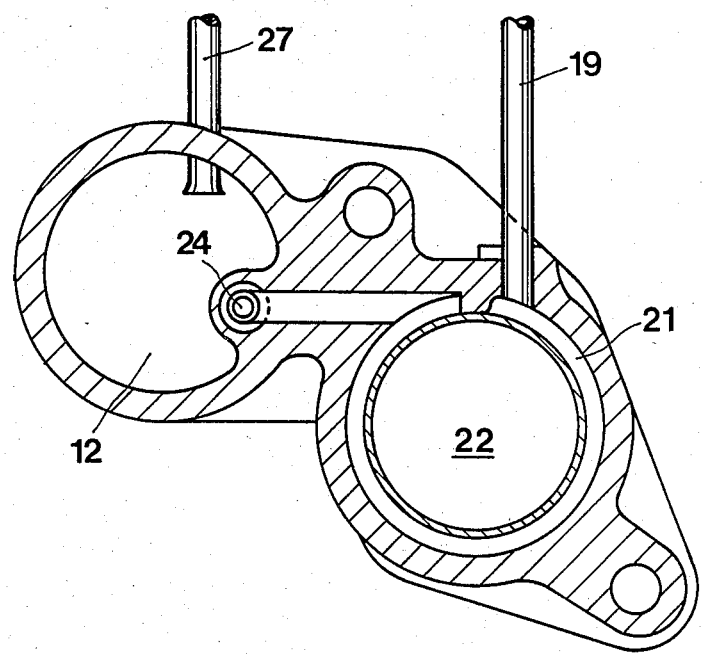
FIG. 11 is a cross-sectional view taken along the line XI—XI in FIG. 10.

If it is not possible to arrange a spacer 17 the heat exchanger 21 can be mounted directly in the outlet manifold as shown in FIGS. 10 and 11.

The function of the engine

The fuel is pumped in a conventional manner by a standard fuel pump 37 from the tank 38 through a fuel filter 39 and if needed a pressure accumulator 40 to the feeding device 20. The fuel is proportioned and distributed in the feeding device and conveyed through the fuel pipe to the heat exchanger 21 in the outlet channel 22, 23, where the fuel is heated up to a temperature between its flame temperature and above its evaporation temperature. When starting or with insufficient, heat-absorption in the exhaust channel, extra heat may be added to the fuel by an electric heater 41, for example by making injection part 24 of the fuel lines 18 of a resistance material (i.e. Kanthal), or by means of exhaust gases.

Through the special way the injection part 24 is directed, the evaporated fuel will be injected in a relative flat path towards the cylinder wall 26 where the fuel will circulate in a spiral passing the spark plug 42 as a final phase of the injection stroke whereby a lean fuel-air-mixture is achieved, which gives a good combustion and a low fuel consumption.

In order to make it possible to use alternative fuels without changing the compression ratio it is possible to add water in a controlled amount and distribute into the combustion chamber.

Water is pumped by a water pump 43 from the water tank 44 by way of the filter 45 to the feeding-device 28. The water distribution line 27 from the feeding device 28 is with its nozzle portion located at the intake channel 12 arranged in such an angle that the water jet will enter at a steeper angle than the injected fuel. The fine water jet from the nozzle portion 29 will enter in a spiral inside the path of the fuel. The purpose of the water injection is to prevent predetonation by cooling and cut off the detonation peak which appears when the motor is run on e.g. 20-octane fuel instead of e.g. the required 98-octane fuel. The energy taken from the detonation peak is consumed for evaporating the water and alcohol, thus causing a stream engine-effect and decomposing the alcohol in different more combustible radicals. This contributes to a cleaner engine and cleaner exhaust gases.

Test results

Practical tests with stationary engines as well as boat- and car engines in traffic have shown good results. Using 98-octane preheated gasoline without water injection and full load, the fuel consumption at 2600 rpm was 178 gr/hph, while when using the carburetor, under the same conditions the fuel consumption was 242 gr/hph.

When using diesel oil as fuel in the same engine as above and with a 25% admixture of gasoline plus water injection we have measured a fuel consumption of 200–220 gr/hph at full load and 3000 rpm.

When using pure diesel oil a fuel consumption of about 110 gr/hph and a water-methanol-consumption (50/50%) of 90 gr/hph could be noticed at full load at 3000 rpm. The compression ratio for the engine was 9:1 and the compression pressure was 11.6.

Very good results have also been achieved with paraffin or alcohol (ethanol and methanol) as fuel.

The invention is not limited to the embodiment shown and described, but a plurality of modifications are possible within the scoop of the claims.

We claim:

1. In an internal combustion engine for alternative fuels and operated at the same compression ratio, wherein the fuel is fed to the cylinders through fuel feed lines and is preheated with heat from the exhaust system and an additional medium which is water or water in combination with other ingredients is fed to the cylinders, the improvement comprising:

a fuel feeding device in the fuel feed lines for proportioning and distributing the fuel to each cylinder in response to the air flow in the air intake;

means for detecting the air flow to the cylinders operatively connected to said fuel feeding device to control said fuel feeding device;

means for feeding the additional medium to each cylinder;

heat exchange means for each cylinder operatively arranged in the exhaust system for heating the fuel prior to entrance into each cylinder to a temperature between its flame temperature and above its evaporation temperature;

a fuel injection means in each inlet channel of the engine connected to the fuel line from the proportioning and distributing device and directed toward the respective inlet valve opening to inject fuel fed therethrough at a substantially flat, tangential angle with respect to the wall of the respective cylinder; and a feeding nozzle for said additional medium in each inlet channel connected to said means for feeding the additional medium and directed toward the respective inlet valve opening to inject the additional medium therethrough inside the path of the fuel at a steeper angle with respect to the cylinder wall than said fuel injection.

2. An internal combustion engine as claimed in claim 1 and further comprising:

an electrical heating device operatively connected to said fuel line to completely or partly preheat said fuel.

3. An internal combustion engine as claimed in claim 1 and further comprising:
each fuel injection means has an injection part having double walls spaced to provide an annulus between the walls; and
means for conducting exhaust gases to said annulus to flow therethrough to heat said fuel.

4. An internal combustion engine as claimed in claim 1 and further comprising:
said fuel injection means between the exhaust system and the inlet channel is insulated externally by a ceramic material.

5. An internal combustion engine as claimed in claim 1 and further comprising:
an exhaust spacer member between the cylinder head and the exhaust manifold;
and said heat exchanger comprises an integrated part of said fuel injection means positioned partly in said exhaust spacer member.

6. An internal combustion engine as claimed in claim 1 and further comprising:
an inlet spacer member provided between the cylinder head and intake manifold; and
said fuel feed line is partly positioned in said inlet spacer member.

7. An internal combustion engine as claimed in claim 5 and further comprising:
an inlet spacer member provided between the cylinder head and intake manifold; and
said fuel feed line is partly positioned in said inlet spacer member.

8. An internal combustion engine as claimed in claim 7 wherein:
said spacer members comprise a single member.

9. An internal combustion engine as claimed in claim 1 and further comprising:
said heat exchanger is part of the fuel line and is disposed in the exhaust manifold.

10. An internal combustion engine as claimed in claim 1 and further comprising:
said heat exchanger is part of the fuel line and is disposed in the cylinder head.

11. An internal combustion engine as claimed in claim 1 wherein said additional medium is water.

12. An internal combustion engine as claimed in claim 1 where said additional medium is water and antifreeze.

* * * * *